P. W. GORMAN.
SELF CLOSING FAUCET.
APPLICATION FILED SEPT. 21, 1912.
1,065,521.
Patented June 24, 1913.
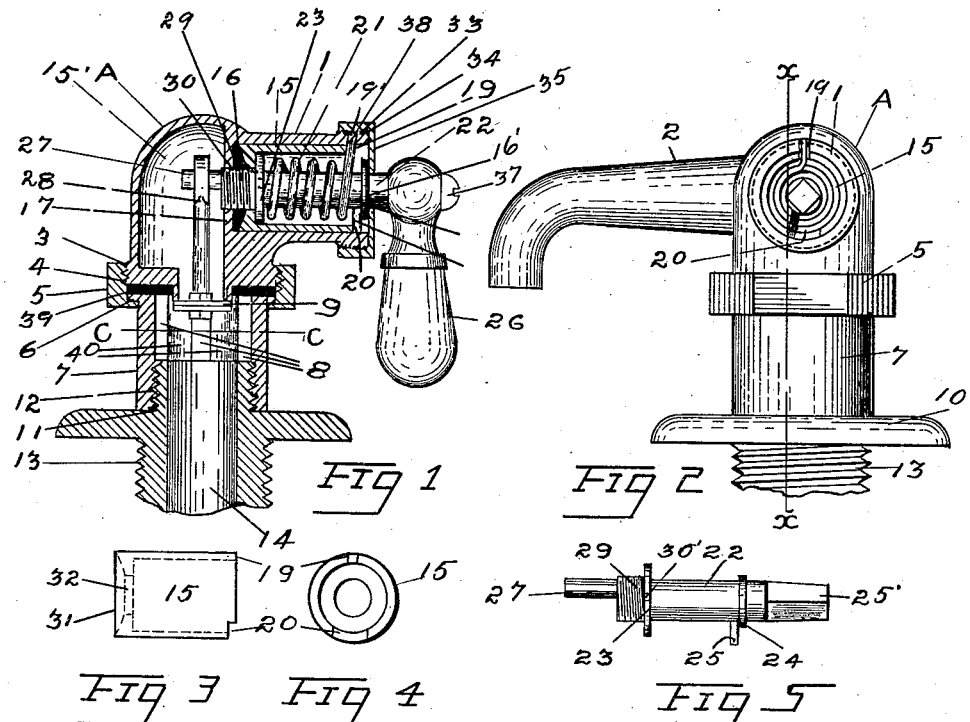

UNITED STATES PATENT OFFICE.

PATRICK W. GORMAN, OF SALT LAKE CITY, UTAH.

SELF-CLOSING FAUCET.

1,065,521.  Specification of Letters Patent.  Patented June 24, 1913.

Application filed September 21, 1912. Serial No. 721,697.

*To all whom it may concern:*

Be it known that I, PATRICK W. GORMAN, a citizen of the United States, residing at Salt Lake City, in the county of Salt Lake and State of Utah, have invented a new and useful Improvement in Self-Closing Faucets, of which the following is a specification.

My invention relates to certain new and useful improvements in self-closing faucets; more especially to a self-closing faucet where a spring is used to operate the movement of the valve to shut off the flow of liquid by spring pressure after the valve stem has been turned and the valve opened by hand operation.

One object of my invention is to provide a self-closing faucet which can be readily removed when it leaks or becomes otherwise defective.

Another object of my invention is to provide a self-closing faucet with a means for preventing the liquid from getting into the spring chamber, thus keeping the spring dry and free from rust.

Another object of my invention is to provide a self-closing faucet where a disk valve or a plug valve may be used to shut off the flow of liquid by spring pressure.

Another object of my invention is to provide a self-closing faucet in which the spring can be removed and the stem packed without the necessity of taking the faucet all apart, as is customary with all other self-closing faucets which are in use today.

Another object of my invention is to construct a self-closing faucet in which the cap can be removed to repair the spring without taking out the stem.

With these and other objects in view, my invention consists of the following novel construction and arrangement of parts, to be hereinafter described and claimed; reference being had to the annexed drawings forming part of this specification, and to the figures of reference marked thereon, in which:—

Figure 1 is a sectional view through line "x—x" of Fig. 2. Fig. 2 is a side elevation showing the cap 35 removed. Fig. 3 is a side view of one of the cylinders 15. Fig. 4 is an end view of Fig. 3. Fig. 5 is a side elevation of the step. Fig. 6 is a sectional plan view through "c—c" of Fig. 1.

Similar letters and numerals refer to like parts throughout the several views.

A denotes the head of the faucet which has a right-angular projection 1 and a spout 2. The lower portion of the head is threaded at 3 for the purpose of receiving the thread 4 on the inside of the collar 5. The shoulder 6 on the upper end of the thimble 7, prevents the collar 5 from slipping off of the thimble 7 when said collar is screwed onto the head. Located on the inner wall of the thimble 7 are lugs 8 which answer as guides for the valve 9. These lugs form an opening between the valve 9 and the inner wall of the thimble 7, this allows the liquid to flow freely when the valve 9 is pushed down by turning the valve stem 22. On the inner wall and at the lower end of the thimble 7 are threads 12 for receiving the threads 11 on the lug 11' of the base 10. From the bottom of the base 10 is a threaded projection 13 for screwing into the pipe.

14 is an opening passing through the base 10.

Within the right-angular projection 1 are located the cylinder 15 and the packing 16 and 16'. Within the cylinder 15 is a coil spring 21 encircling the stem 22. Located on the stem 22 are two collars 23 and 24 and a lug 25. One end of the stem 22 is squared for receiving the handle 26, the other end of said stem has a projection 27 forming an eccentric which fits into a hole in the upper end of the valve stem 28. Directly back of the projection 27 are threads 29 for screwing into the hole 30 in the wall 17 of the head 1.

The inner end 31 of the cylinder 15 is concaved. A hole 32 runs through the center of said concaved end. The hole 32 allows the stem 22 to pass through. On the outer end of the cylinder are located notches 19 and 20.

On the end of the right-angular projection 1 are threads 33 for receiving the threads 34 which are on the inner surface of the cap 35.

In assembling my invention, I start with the collar 5 by placing it over the thimble 7; then I screw the thimble 7 onto the base 10; now I place the spring 21 around the stem 22, placing one end of said spring into the hole 30' on the collar 23 of the stem 22; I now place the spring 21 and the stem 22 into the cylinder 15; now I insert the washer 16 into the right-angular projection 1; I then place the cylinder 15, the spring 21 and the stem 22 into the right-angular projection 1; now I place the washer 16' and the cap 35 over the stem 22; I then place on the handle 26 and put in the screw 37; now I insert the valve stem 28 into the opening 15' of the head A, placing it over the eccentric end 27 of the stem 22; now I screw the threaded end 29 of said stem into the threaded hole 30 in the wall 17 of the head A, thus holding the stem 22 firmly in the head A; now I place the lug 25 into the notch 20 of the cylinder 15, this lug prevents the handle from turning too far around by coming in contact with the notch 20; now I place the end 33 of the coil spring 21 into the notch 19 of the cylinder 15 and allow the end of said spring to extend into a notch 38 in the right-angular projection 1; now I screw on the cap 35. The washers 16 and 16' are compressed into their relative places by the screwing on of the cap 35. I now place a washer 39 into the collar 5; now I screw the collar 5 onto the head A by the threads 3, thus completing the construction of my invention.

In the operation of my invention I apply the power to the handle 26, thus turning the stem 22, which operates the valve 9 by pressing it downward with the eccentric end 27 until said valve is open. When the said valve is open it allows the liquid to flow from the opening 14 into the thimble 7, through the grooves 40 which are between the lugs 8, up past the valve 9, then out through the spout 2, thus completing the operation of my invention.

Having thus described my invention, what I claim as new and desire to secure by Letters Patent is:—

1. Self-closing cock comprising in combination, a casing having an inlet provided with a valve seat and also having a spout leading therefrom, a valve for said seat, an extension for said casing having a threaded opening, a cylinder in said extension provided with an opening registering with the opening in said extension, a packing disposed between said cylinder and the wall of said extension, an operating stem extending through the opening in said cylinder and having threaded engagement with the threaded opening in said extension and provided with a connection with said valve, means for engaging said cylinder to force the same against said packing, and means for returning the stem to a starting position and assisting in maintaining said cylinder in engagement with said packing, substantially as described.

2. A self closing cock comprising in combination, a casing having an inlet provided with a valve seat and also having a spout leading therefrom, a valve for said seat, an extension for said casing having a threaded opening, a cylinder in said extension provided with an opening registering with the opening in said extension, a packing disposed between said cylinder and the wall of said extension, an operating stem extending through the opening in said cylinder and having threaded engagement with the threaded opening in said extension and provided with a connection with said valve, said stem having a flange engaging said cylinder to force the same against said packing, and a coil spring having one end connected with said stem and the other end connected with said extension for returning the stem to a starting position and assisting in maintaining said cylinder in engagement with the said packing, substantially as described.

PATRICK W. GORMAN.

Witnesses:
L. N. PUTNAM,
C. O. BROWN.

Copies of this patent may be obtained for five cents each, by addressing the "Commissioner of Patents, Washington, D. C."